US009716376B2

(12) United States Patent
Maier et al.

(10) Patent No.: US 9,716,376 B2
(45) Date of Patent: Jul. 25, 2017

(54) MOUNTING FOR A DATA CONDUCTOR, ENERGY TRANSMISSION SYSTEM AND DATA TRANSMISSION SYSTEM

(75) Inventors: Bernd Maier, Schliengen (DE); Frank Pietschmann, Maulburg (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 789 days.

(21) Appl. No.: 14/112,419

(22) PCT Filed: Apr. 20, 2012

(86) PCT No.: PCT/EP2012/057261
§ 371 (c)(1),
(2), (4) Date: Dec. 19, 2013

(87) PCT Pub. No.: WO2012/143506
PCT Pub. Date: Oct. 26, 2012

(65) Prior Publication Data
US 2014/0159968 A1    Jun. 12, 2014

(30) Foreign Application Priority Data

Apr. 21, 2011    (DE) .................. 10 2011 002 239

(51) Int. Cl.
*H02G 7/08* (2006.01)
*B60L 5/40* (2006.01)
(Continued)

(52) U.S. Cl.
CPC .................. *H02G 7/08* (2013.01); *B60L 5/40* (2013.01); *H01Q 1/3208* (2013.01); *H01R 41/00* (2013.01); *B60L 2200/26* (2013.01)

(58) Field of Classification Search
CPC ..... B60L 2200/26; B60L 5/40; H01Q 1/3208; H01R 41/00; H02G 7/08
(Continued)

(56) References Cited

U.S. PATENT DOCUMENTS 4,375,193 A    3/1983  Sullivan
6,089,512 A *  7/2000  Ansorge .................. B60L 5/005
                                                    104/88.03
(Continued)

FOREIGN PATENT DOCUMENTS

DE    3300202 A1    7/1984
DE    3311362 C1    7/1984
(Continued)

OTHER PUBLICATIONS

English Translation of International Search Report (ISR) published Jul. 9, 2013 for International Patent Application No. PCT/EP2012/057261 filed on Apr. 20, 2012.
(Continued)

*Primary Examiner* — Dimary Lopez Cruz
(74) *Attorney, Agent, or Firm* — Paul D. Bianco; Gary Winer; Fleit Gibbons Gutman Bongini & Bianco PL

(57) ABSTRACT

The invention relates to a mounting for a data conductor on a conductor strand of a conductor line. The invention further relates to an energy transmission system for transmitting electrical energy between a conductor line and an electrical consumer that can be moved along the conductor line and has at least one data conductor guided along the conductor line and at least one antenna arranged on the consumer, and to a data transmission system for contactless local data transmission between at least one data conductor guided along a conductor line and at least one antenna arranged on an electrical consumer that can be moved along the conductor line. The invention solves the problem of enabling a compact construction, simple, fast fitting and retrofitting of an energy transmission system and reliable data transmission in an energy transmission system by means of a mounting having a mounting means that is adapted to an outer contour of the conductor strand for fastening the mounting to the conductor strand and a fastening means for (Continued)

fastening the data conductor to the mounting at a distance from the conductor strand, and by means of an energy transmission system and a data transmission system, which comprise a multiplicity of mountings for mounting the data conductor at an invariant distance from a conductor strand of the conductor line.

27 Claims, 7 Drawing Sheets

(51) Int. Cl.
*H01R 41/00* (2006.01)
*H01Q 1/32* (2006.01)

(58) Field of Classification Search
USPC ......... 174/41–40 TD; 191/10; 343/711, 720, 343/787, 884, 904–906
See application file for complete search history.

(56) References Cited

U.S. PATENT DOCUMENTS

| | | | |
|---|---|---|---|
| 6,978,873 B2* | 12/2005 | Ishioka | B60L 5/005 191/10 |
| 7,137,494 B2 | 11/2006 | Swoboda et al. | |
| 7,204,192 B2* | 4/2007 | Lamb | B60L 13/04 104/281 |
| 8,347,789 B2 | 1/2013 | Wolf et al. | |
| 2005/0098404 A1 | 5/2005 | Swoboda et al. | |
| 2009/0013899 A1* | 1/2009 | Wolf | B60L 5/005 104/288 |
| 2009/0184587 A1* | 7/2009 | Fernandez Diaz | B64F 1/305 307/145 |

FOREIGN PATENT DOCUMENTS

| | | |
|---|---|---|
| DE | 10347851 A1 | 6/2005 |
| DE | 102004008571 A1 | 10/2005 |
| EP | 0814994 B1 | 1/2000 |
| JP | S6143702 U | 3/1986 |
| JP | S6221702 U | 2/1987 |
| JP | S8324902 U | 2/1988 |
| WO | 2007090500 A2 | 8/2007 |

OTHER PUBLICATIONS

Written Opinion (WO) for International Patent Application No. PCT/EP2012/057261 filed on Apr. 20, 2012.
English translation of International Preliminary Report on Patentability (IPRP) published Oct. 22, 2013 for International Patent Application No. PCT/EP2012057261 filed Apr. 20, 2012.
English translation of Written Opinion (WO) published Oct. 21, 2013 for International Patent Application No. PCT/EP2012057261 filed Apr. 20, 2012.

* cited by examiner

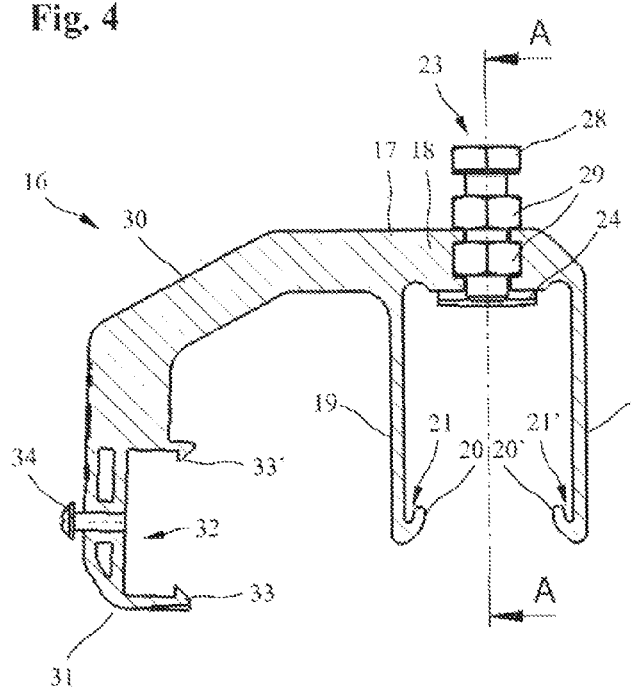
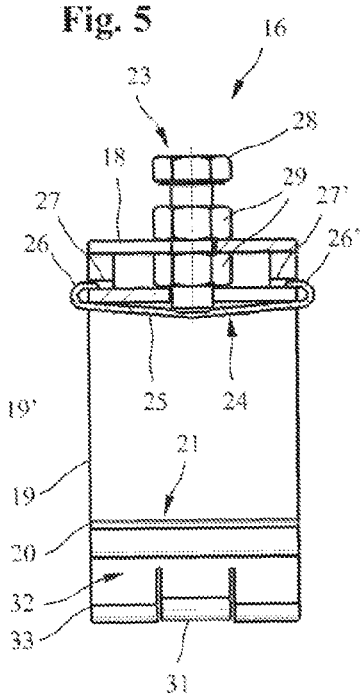
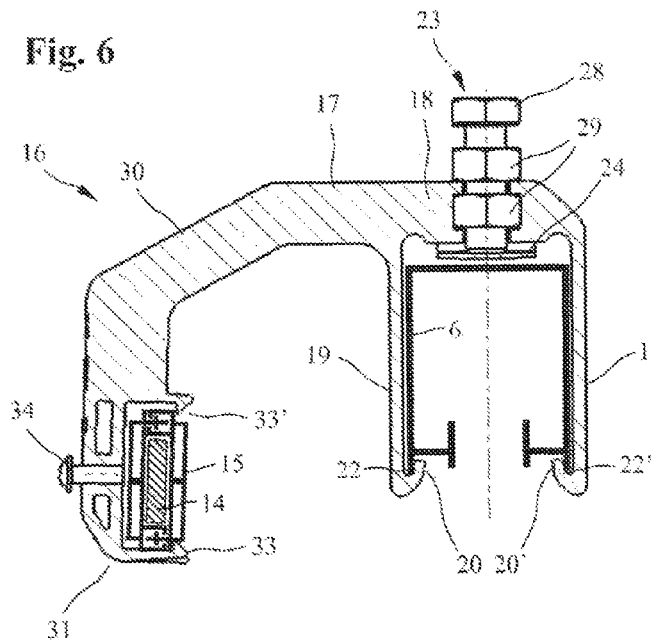
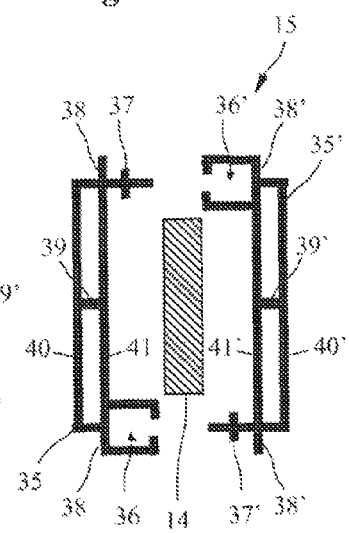

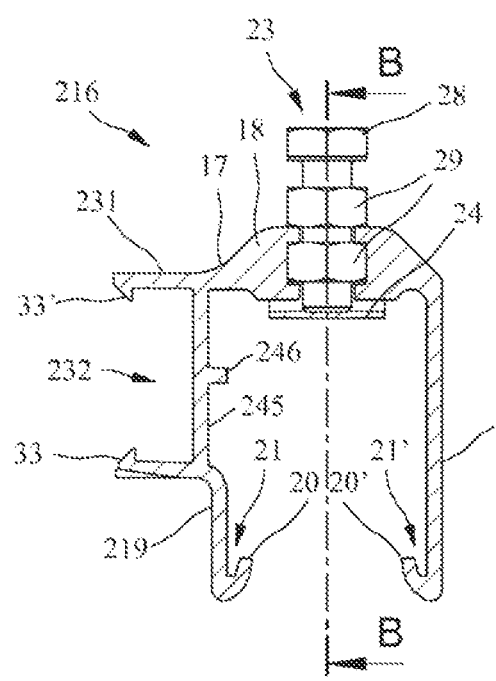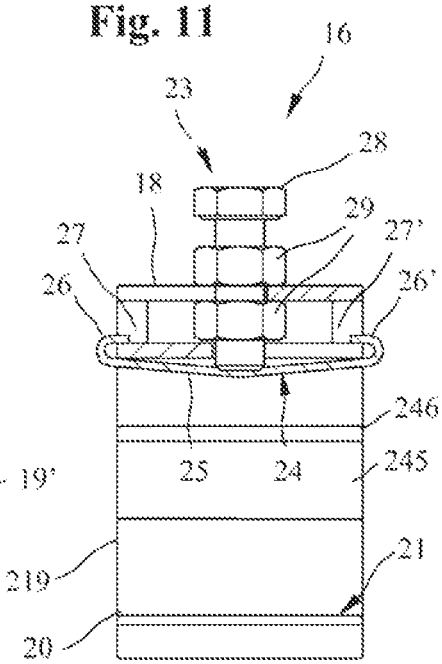

MOUNTING FOR A DATA CONDUCTOR, ENERGY TRANSMISSION SYSTEM AND DATA TRANSMISSION SYSTEM

FIELD OF THE INVENTION

The invention concerns a mounting for a data conductor on a conductor strand of a conductor line, an energy transmission system according to the preamble of Claim 15, and a data transmission system according to the preamble of Claim 23.

BACKGROUND OF THE INVENTION

With known energy transmission systems designed as conductor line systems, an electrical consumer moves along a conductor line and via a current collector and removes current from one or more conductor line strands. In order to also be able to transmit control data for the control of the vehicle, for example, a crane, some data lines are usually arranged along the conductor line. For example, some data lines are arranged along the conductor line, into which an antenna intervenes, which moves with the vehicle over an additional carrier of the vehicle. The data transmission usually takes place thereby only locally, limited to the area of the data conductors in which the antenna is actually moving. Other contactless, remote data transmissions, for example, a radio transmission, with a central transmission antenna and receivers arranged on the vehicles, in which, therefore, the distance between the central transmission antenna and the individual receivers ranges from some 10 to over one hundred meters, cannot be used for various reasons. Thus, with the high transmitted currents and voltages and the use of high-cycled changeovers with such conductor lines, there are often transmission-caused disturbances of such radio transmissions. In the state of the art, therefore, a locally limited contactless data transmission is used between the conductor line and the vehicle with such energy transmission systems, which requires a small spatial proximity between the antenna and receiver in the centimeter range.

As a rule, the known unit requires an additional, expensive track construction with its own complete mounting for the data conductor, which must be placed at a remote distance from the actual conductor lines. Also, its own collector trolley, on which the receiver of the movable consumer is located, is necessary.

In order to overcome this disadvantage, DE 10 2004 008 571 A1, which has a carrying track with a running surface with a vehicle bound to a track, provides for the integration of a slotted hollow conductor into the carrying track. The carrying track profile thereby has a slotted hollow space extending along the carrying track, wherein through the slot, an antenna located on a vehicle can couple or decouple electromagnetic waves into the hollow space. This model has a compact construction; however, a fitting or retrofitting of an existing unit or a replacement of a defective slotted hollow conductor is not possible because of the slotted hollow conductor integrated in the carrying track.

WO 2007/090500 A1 discloses a transport system with a track system and cars arranged on it such that they can move, wherein a primary conductor system is provided on the track system, on which at least one secondary coil, comprised by the individual car, is inductively coupled to the contactless transmission of electrical power and/or information. The stationary track system thereby has mounting elements for the primary conductors, which are clipped into a basic mounting profile. Furthermore, a slotted coaxial conductor can be clipped into the basic mounting profile via another mounting profile that is suitably constructed for the transmission of data, wherein the cars comprise at least one antenna, which is conducted along this coaxial conductor. This construction is expensive with respect to assembly technology, and in particular, a mounting possibility must already be provided in the basic mounting profile for the mounting profile of the coaxial conductor. A simple and subsequent assembly of a coaxial conductor is not readily possible there.

DE 103 47 851 A1 discloses an apparatus with which electrical energy can be transmitted from one energy cable, which is placed long a stationary track of a movement system, to a movable element that can travel along the track, wherein a transmission head of the movable element interacts inductively with the energy cable. The energy cable is attached by means of a carrying profile that essentially extends along the track and is affixed to it in a detachable manner. Immediately next to the energy cable, a data cable of a data bus is held by means of the same carrying profile. Among other things, the disadvantage with this is that the data cable cannot be mounted at a distance or separately from the energy cable.

EP 0 814 994 B1 concerns a track-conducted transport system with inductive energy transmission—among other elements, an E-shaped primary conductor on a U-shaped secondary conductor—and serves as an advantageous replacement for systems in which the energy is supplied via sliding contacts. Among other things, an embodiment is described there in which an outer U-profile of the primary conductor for the inductive transmission of energy is simultaneously used there as a carrying element for a coaxial cable for the transmission of information. A foot, firmly connected to the coaxial cable, however, is connected there only in a small sector with the primary conductor.

DE 33 11 362 C1 concerns a conductor line arrangement with line conductors lying parallel to one another, which are affixed on a common mounting and are placed on a carrying track of the conductor line arrangement. The mounting thereby has a mounting arm and a folding arm, which are connected to one another such that they can be folded via a theoretical bending site like a film hinge, and are additionally secured in the work position of the theoretical bending site via a mounting lug correlated with the mounting arm and a mounting claw correlated with the folding arm. An additional mounting for a conductor line is not provided there.

SUMMARY OF THE INVENTION

The goal of the invention is, therefore, to make available a mounting for a data conductor on a conductor line, an energy transmission system and a data transmission system, which overcome the aforementioned disadvantages and make possible a compact mode of construction, a simple, rapid fitting and retrofitting of an energy transmission system and a reliable data transmission.

The goal of the invention is attained by a mounting for a data conductor on a conductor line with the features of Claim 1, an energy transmission system with the features of Claim 15, and a data transmission system with the features of Claim 23. Advantageous refinements and preferred developments of the invention are indicated in the subclaims.

The mounting in accordance with the invention for a data conductor on a conductor strand of a conductor line has a mounting means that is adapted to an outer contour of the conductor strand for the affixing of the mounting on the conductor strand, and an affixing means for the affixing of the data conductor to the mounting at a distance to the conductor strand. In this way, the data conductor can be maintained at the same distance to the conductor strand, wherein it can implement changes of the alignment of the conductor strand.

Preferably, the mounting means can have an affixing device for affixing the mounting on the conductor strand, wherein an additional affixing of the mounting means is guaranteed.

In a development that is advantageous with respect to assembly technology, the affixing means can have a holder with a holder space or an inner contour that is adapted to the outer contour of the data conductor or a data profile surrounding the data conductor.

In order to enable a rapid and simple insertion and removal of the data conductor or the data conductor profile into or from the holder, snap hooks can be provided in an open side of the holder space in order to snap in and hold the data conductor or the data conductor profile.

Advantageously, on a side of the holder opposite the open side of the holder space, it is possible to provide at least one affixing screw that extends through the mounting in order to affix the data conductor or the data conductor profile to the snap hooks.

In one advantageous embodiment, the data conductor profile can consist of two elongated profile halves that can be latched to one another, embracing the data conductor to some extent.

In one advantageous embodiment of the invention, the fastening means can be placed on one side directly on the mounting means, turned away from the conductor strand, so that a particularly space-saving development is possible. Preferably, in this case, with an energy transmission system in accordance with the invention, the data conductor can be placed by means of the mounting on a current remover, in particular, relative to another current remover of a current remover car of an external current remover, and the antenna can be placed on the current remover car.

The energy transmission system in accordance with the invention is characterized in that a plurality of mountings in accordance with the invention placed on the conductor line in its longitudinal direction, at a distance from one another, and described above and below, hold the data conductor at a distance from the conductor line.

In one advantageous development of the energy transmission system, another plurality of mountings in accordance with the invention placed on the conductor line in its longitudinal direction at a distance from one another, and described above and below, hold another data conductor at a distance from the conductor line, wherein another antenna is located on the consumer.

Advantageously, the mountings hold the data conductor at an essentially invariant horizontal and/or vertical distance from the conductor line, in particular, an external conductor strand, wherein, in this way, it is also guaranteed that the data conductor and the antenna remain transverse to the longitudinal direction of the conductor line and the line strand, relative to one another, in the same position.

Advantageously, several or all mountings can be placed on one single conductor strand, in particular, relative to other conductor stands of the conductor line of the external conductor strand of the conductor line, wherein in a corresponding, advantageous development, the antenna can be placed on a current remover, in particular, relative to other current removers of a current remover car of external current removers.

In one advantageous development, the part of the current remover on which the antenna is placed can be supported on the consumer such that it can move in a vertical direction, opposite the conductor line and the consumer, wherein a means is provided for the movement of the current remover in the direction of the conductor line. The means can be, for example, a spring that presses this part of the current remover from the consumer or a current remover car away toward the conductor line. In this way, it is advantageously possible to additionally compensate for elevation shifts of the conductor strand relative to the conductor line.

The data transmission system in accordance with the invention is characterized by a plurality of mountings in accordance with the invention, described above and below, to hold the data conductor at an invariant distance from a conductor strand of the conductor line.

BRIEF DESCRIPTION OF THE DRAWINGS

The invention will now be described with the aid of an embodiment example, with reference to the accompanying drawings. In the figures:

FIG. 4 shows a section through a mounting in accordance with the invention;

FIG. 5 shows a section through the mounting from FIG. 4, along line A-A;

FIG. 6 shows the view of the mounting from FIG. 4 on an insulation profile of the conductor line and with a data conductor inserted into a carrying profile;

FIG. 7 shows a schematic exploded section through the carrying profile with a data conductor from FIG. 6;

FIG. 10 shows a section through the alternative mounting in accordance with the invention from FIG. 9;

FIG. 11 shows a section through the mounting from FIG. 10, along line B-B;

DETAILED DESCRIPTION OF THE INVENTION

Figure 1:
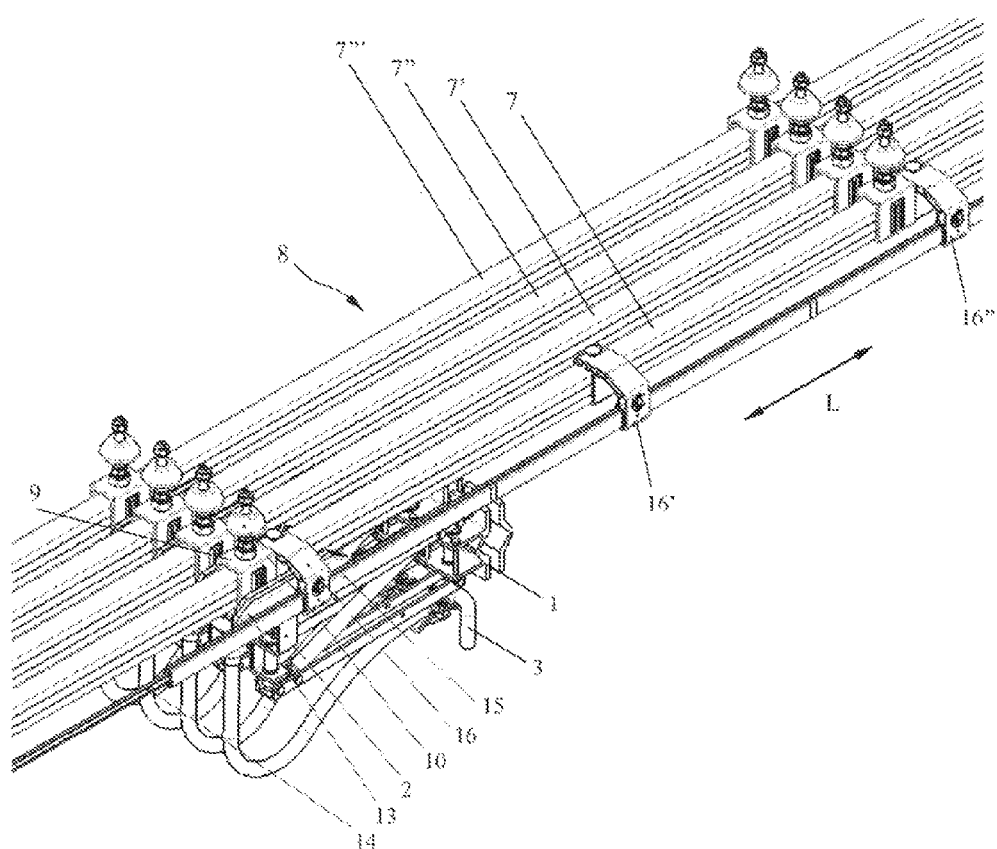
FIG. 1 shows a schematic, three-dimensional view of a part of an electrical energy transmission system in accordance with the invention, with a data transmission system in accordance with the invention, and a mounting in accordance with the invention.

FIG. 1 shows an energy transmission system in accordance with the invention as it is used, for example, to provide a nondepicted, movable electrical consumer with electrical energy, designed as a container stapling crane.

Figure 2:
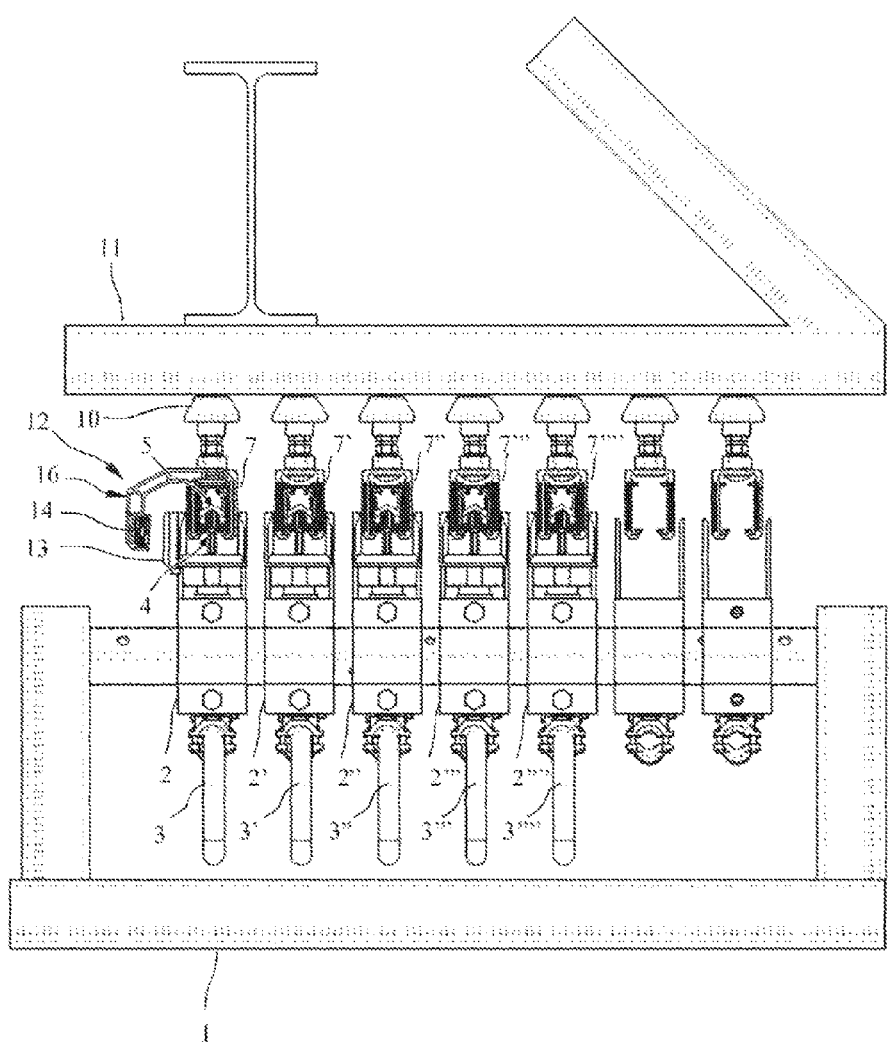
FIG. 2 shows a partially cutaway schematic top view of the energy transmission system of FIG. 1, seen from the rear to the right, at an incline, in FIG. 1.

To this end, a current remover car 1, alluded to only schematically in FIGS. 1 and 2, is mounted on the crane. Five current removers 2, 2', 2", 2''', 2"", etc. [sic], designed in a largely identical manner, are affixed on the current remover car 1, and for this reason, above all, current remover 2 is described below. The statements in this regard are also correspondingly valid for the other current removers 2-2'''' etc., unless otherwise indicated.

In a known manner, the current remover 2 supplies, via a supply cable 3, electrical consumers of the vehicle with electrical energy. To this end, a slider 4 is pressed upward, by means of the force of a spring, against an electrical conductor 5a, held in a conductor profile 5. Alternatively, the conductor profile 5 can also be designed to be electrically conductive. In normal operation, the conductor 5a is under tension, so that a current is transmitted from the conductor 5a to the slider 4. Usually, several current removers 2-2'''', etc. are provided for the supply of electrical energy to the electrical consumers, whereas one of the current removers intervenes for the grounding of the vehicle of grounding conductors held in a conductor profile.

For the additional electrical insulation and for the protection against external effects, the conductor profile 5 is inserted into an insulation profile 6. The conductor profile 5 and the insulation profile 6 form an elongated conductor strand 7, which with several essentially identical conductor strands 7', 7'', 7''', 7'''', running parallel to one another, form a conductor line 8. For reasons of simpler representation, only the four conductor strands 7, 7', 7'', 7''' from FIG. 2 are shown in FIG. 1. The conductor strand 7 is affixed to a carrying rod 11, shown only in FIG. 2, by an insulation profile carrier 9 of an affixing element 10, embracing the insulation profile 6. The other conductor strands 7', 7'', 7''', 7'''' are accordingly affixed to the carrying rod 11 as described above. As can be seen from FIG. 1, the conductor strands 7, 7', 7'', 7''', 7'''' are affixed to the conductor line 8 at regular intervals of the corresponding carrying rods.

The components of the energy transmission system described above are, in fact, known to the specialist in their development and function and do not require any further explanation.

For the transmission of data between the vehicle and the energy transmission system—for example, control data for the vehicle or energy request data by the vehicle on the energy transmission system—a data transmission system 12 is provided. The data transmission system 12 has an antenna 13, which is preferably mounted on the outside of the current remover 2, completely on the left side in FIG. 2, which is shown in detail in FIG. 3. In this way, the antenna 13 can be directly carried along by the current remover car 1, and a compact construction is produced. The antenna 13 is connected to a data evaluation unit of the vehicle via conduits that are not depicted.

As the counterpart of the antenna 13, a data conductor 14 is provided, which is surrounded by a two-part data conductor profile 15 made of plastic. The data conductor profile 15 is used for protection, as a mounting means, and for the insulation of the data conductor 14. The data conductor 14 is connected to a data transmission unit of the energy transmission system.

In order to enable a secure data transmission between the antenna 13 and data conductor 14, which is insensitive to external disturbances but nevertheless energy-saving, the data conductor 14 is affixed to the conductor strand 7, corresponding to the current remover 2, by means of a mounting 16 in accordance with the invention, at a small distance A from the antenna 13. As can be seen in FIG. 1, the mounting 16 is placed in the longitudinal direction L, directly next to the affixing element 10 on the conductor strand 7. Along the conductor strand 7, additional mountings 16', 16'' in accordance with the invention, at regular longitudinal intervals, hold the data conductor 13 in the data conductor profile 15 at a largely invariant distance A from the conductor strand 7. Small, manufacturing- and assembly-caused deviations are clearly smaller than distance A. This guarantees that the antenna 13 is always conducted past the data conductor 14 at a largely invariant lateral distance A. The reason for this is that by affixing the mountings 16, 16', 16'' directly on the conductor strand 7, eventually curvatures or a sagging of the conductor strand 7 are carried out between the carrying rod 11 by the data conductor 14 and thus compensated for. Likewise, the mountings 16, 16', 16'', etc., also guarantee that the data conductor 14 is conducted in a vertical direction at the largely invariant height relative to the conductor strand 7. Since the antenna 13 is advantageously supported on the part of the current remover 2 that is pressed toward the conductor 5a, antenna 13 and data conductor 14 also remain in the vertical direction, aligned largely unchanged with respect to one another. In particular, also, by the pressing of the counterpart 4, height shifts of the conductor strand 7, produced on the conductor 5a, are carried out by the mountings 16, 16', 16'', etc., affixed directly on the conductor strand 7, and thus compensated for. The antenna 13 and the data conductor 14 thus remain transverse to the longitudinal direction L, relative to one another, in the same position.

Figure 3:
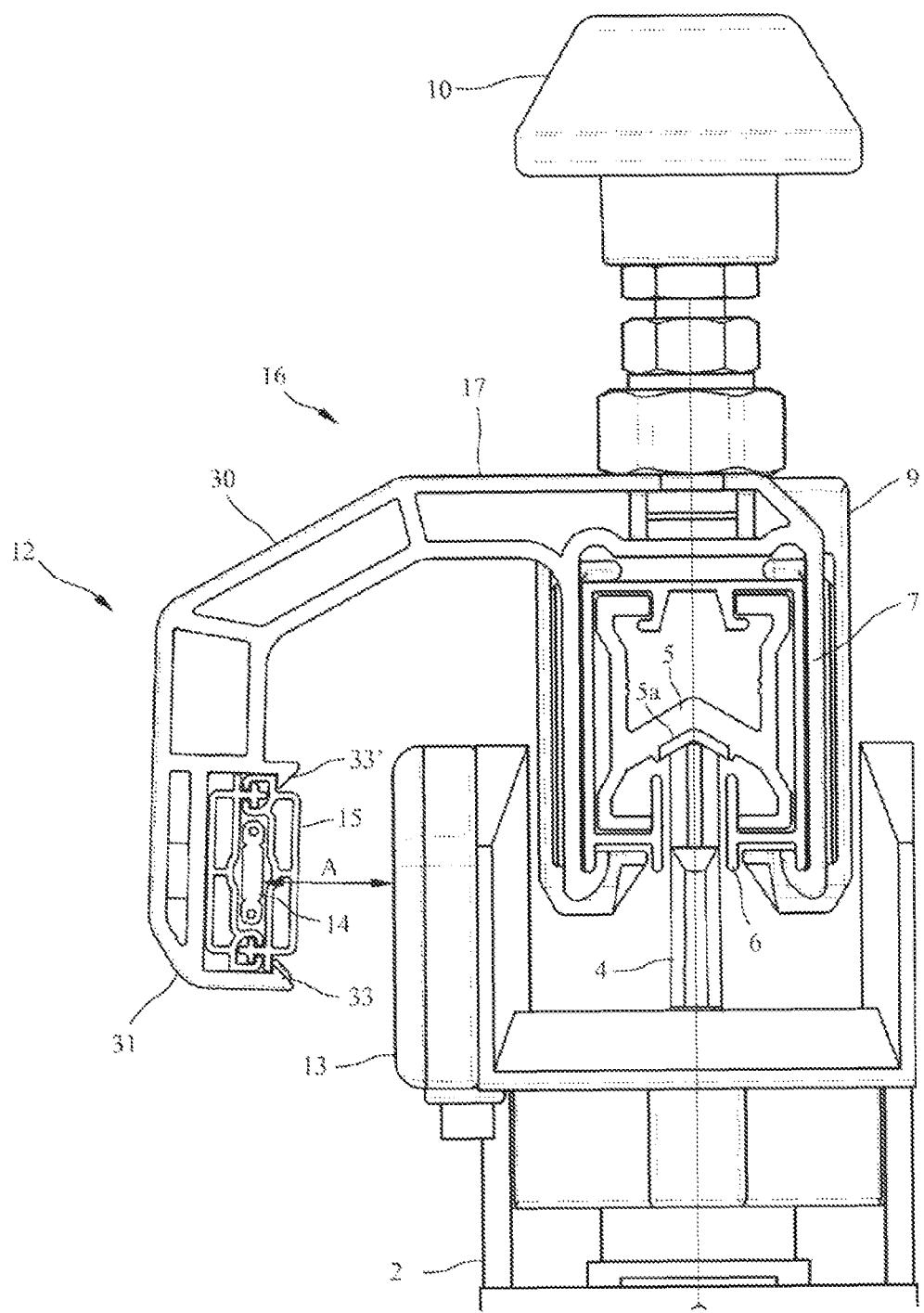
FIG. 3 shows a detailed view of the data transmission system in accordance with the invention of the energy transmission system from FIG. 2.

The mounting 16 will now be explained in detail, above all with the aid of FIGS. 4-6. The mounting 16 has the cross section shown in FIGS. 4 and 6, wherein, for reasons having to do with a simpler representation, the mounting 16 is drawn as a solid profile section. The mounting 16 can advantageously be made of plastic or another dimensionally stable material that can yield to certain limits. It can advantageously be made of a hollow profile material, as shown in FIGS. 2 and 3, or a solid material, as drawn in FIG. 3 [sic; FIG. 4].

For the affixing on the conductor strand 7, the mounting section 17 of the mounting 16 has two elastic, but nevertheless dimensionally stable, mounting legs 19, 19' extending from a middle section 18 at a distance from one another, opposite one another, with latching lugs 20, 20' facing one another, pointing toward the middle section 18, with corresponding latching grooves 21, 21' on their front, free ends. For affixing the mounting 16 on the conductor strand 7, the mounting section 17 is stuck, from above in FIG. 6, onto the insulation profile 6, shown only schematically in FIG. 6, wherein the mounting legs 19, 19' are thereby pressed away laterally. If the mounting section 17 is completely set on the insulation profile 6, the latching lugs 20, 20' snap on the front, free end of the insulation profile 6, which is the lower end in FIG. 6, via corresponding latching legs 22, 22'.

The mounting legs 19, 19' are advantageously designed somewhat longer than side walls of the essentially U-shaped insulation profile 6, and the inner distance between the two mounting legs 19, 19' is advantageously somewhat larger than the outer distance of the side walls of the insulation profile 6. The space surrounded by the middle section 18 and the mounting legs 19, 19' and the inner contour of the mounting section 17, defined in this way, is thus adapted to the outer contour of the insulation profile 6. In this way, a secure seat of the mounting 16 can be ensured on the insulation profile 6, in particular, with only small differences between the inner contour of the mounting section 17 and the outer contour of the insulation profile 6.

In addition, for the further improvement of the seat of the mounting 16 on the insulation profile 6, a fixing device 23 can be provided on the area of the mounting section 17, which is the upper area in FIGS. 4-6. The fixing device 23 has a clamping sheet 24, which can be readily recognized in FIG. 5, with a clamping section 25, which is flat in the unburdened state. On the ends 26, 26', which are the right and left ends in FIG. 5, the clamping sheet 24 is bent around 180° and meshes into latching slits 27, 27' of the mounting section 17, so that the clamping sheet 24 cannot be readily removed. In the unburdened state, the clamping section 25 is flush on the middle section 18 of the mounting section 17. Furthermore, a clamping screw 28 is provided on the mounting section 17, which can be screwed, via mounting nuts 29 affixed on the mounting section 17, toward the clamping sheet 24. In this way, as can be seen in FIG. 6, the clamping sheet 24 can be pressed from above against the insulation profile 6, wherein the latching lugs 20, 20' of the mounting legs 19, 19' are firmly pulled toward the latching legs 22, 22' of the insulation profile 6, and thus the latching legs 22, 22', into the latching grooves 21, 21', so that the mounting 16 can be additionally fixed on the insulation profile 6 in a rapid and simple manner.

From the mounting section 17, a cantilever arm 30 of the mounting 16 runs laterally and transverse to the longitudinal direction L to a data conductor section 31. The cantilever arm 30 has available a slanted area, which goes over into the data conductor carrying section 31.

Likewise, however, other shapes can be chosen for the mounting 16, which ensure that the data conductor 14 is held at a desired distance from the conductor strand 7.

The data conductor carrying section 31 has a holder 32, turned toward the mounting section 17, for the data conductor profile 15 of the data conductor 14, wherein the data conductor profile 15 from FIGS. 2 and 3 is shown merely schematically in FIGS. 6 and 7. The holder 32 advantageously has, in this respect, an inner contour with a U-shaped cross section, adapted to the outer contour of the data conductor profile 15. On the open side of the holder 32, snap hooks 33, 33' are provided, which securely hold the data conductor profile 15 in the holder 32. Since the snap hooks 33, 33' can be elastically pressed to the side to a certain extent, the data conductor profile 15, which can be clearly seen in FIG. 6, is clipped into the holder 32 simply and readily. The holder 32 thus makes available a secure seat of the data conductor profile 15 on the mounting 16. As can be seen, in particular from FIG. 5, the lower snap hooks 33 can also be subdivided in the longitudinal direction L, wherein a middle part of the snap hook is moved slightly upward opposite the parts lying next to it. In this way, the data conductor profile 15 can be clipped into and again removed from the holder more readily. Alternatively or additionally, the upper snap hook 33' can also be advantageously subdivided, correspondingly or in an opposite manner.

In order to be able to additionally secure the data conductor profile 15 in the holder, a fixing screw 34 is provided, which can be screwed through a threaded hole that extends in the area of the holder 32 through the data conductor section 31. In this way, the data conductor profile 15 is pressed from the left side, in FIG. 6, to the right, against the snap hooks 33, 33' and sits firmly there.

In order to be able to simply insert the data conductor 14 into the data conductor profile 15, the data conductor profile 15 advantageously has the structure of identically designed, elongated profile halves 35, 35', schematically shown in the cross section in FIG. 7. At an end of the profile halves 35, 35', a latching space 36, 36' is thereby provided, in which a latching cross 37, 37' of the other opposite end of the profile halves 35, 35' is introduced and can be latched therein. In this respect, the transverse beams of the latching crosses 37, 37' are designed somewhat wider than the openings of the latching spaces 36, 36'. Since the profile halves 35, 35' can be made from a material which is, to a certain extent, elastic, for example, plastic, the profile halves 35, 35' can thus be simply clipped together, wherein the data conductors come to lie between the profile halves 35, 35' and are held flush there. Furthermore, the profile halves 35, 35' have stops 38, 38', which are provided to latch with the snap hooks 32, 32' of the holder 32. Bars 39, 39' are provided between elongated legs 40, 41 or 40', 41', so as to be able to press the data conductor profile 15 securely, with the fixing screw 34, against the snap screws 32, 32'.

Figure 8:
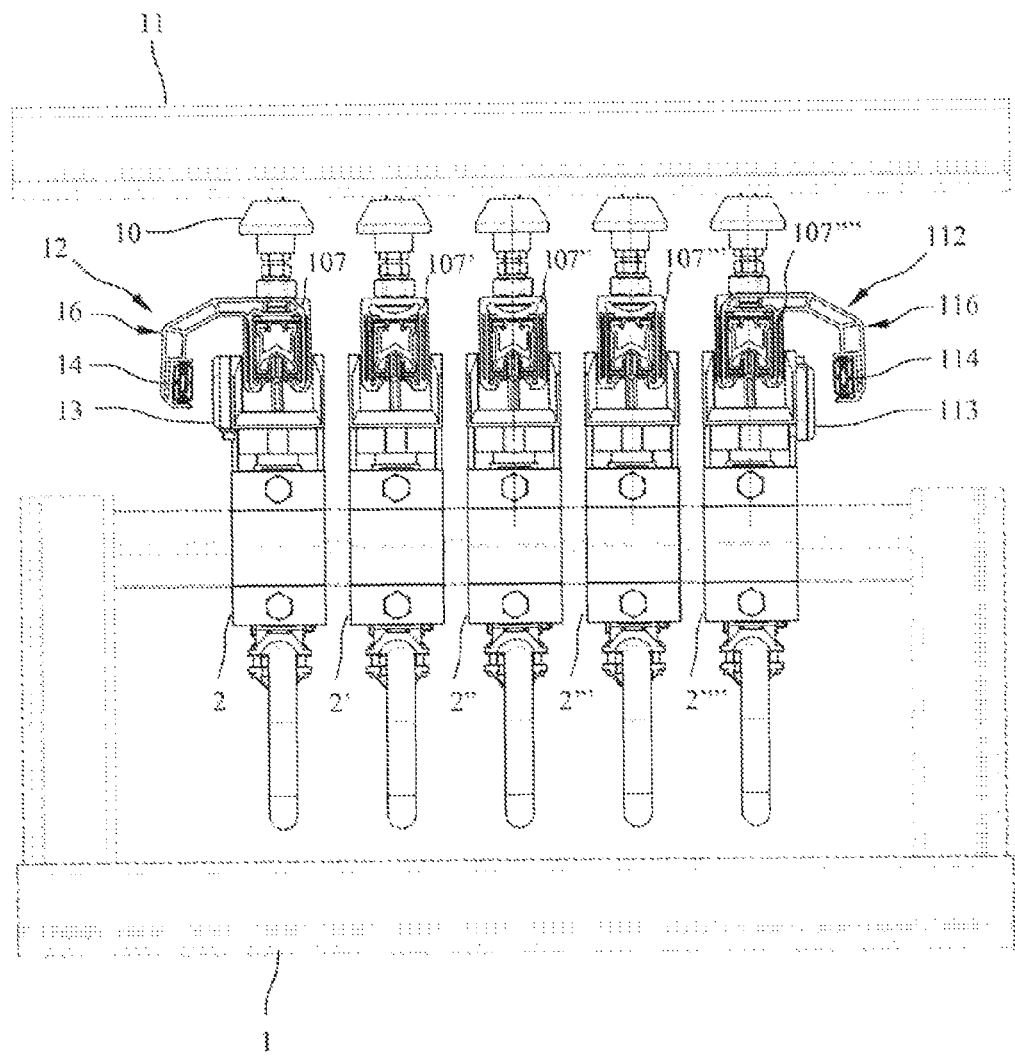
FIG. 8 shows an alternative development of the data transmission system.

FIG. 8 shows another development of an energy transmission system in accordance with the invention, which is largely in agreement with the energy transmission system described above. For the same parts, therefore, the same reference symbols are used and only the differences between the two developments are described below.

The alternate energy transmission system differs, on the one hand, in the number of conductor strands 107, 107', 107'', 107''', and 107'''' from the development according to FIG. 2, wherein this is a common development for the specialist. For the advantageous increase in the data transmission rate, however, another correspondingly developed data transmission system 112 is placed here, on the outside, which is entirely to the right in FIG. 8, in addition to the data transmission system 12 on the left conductor strand 107 in FIG. 8. To this end, another antenna 113 is affixed on an outside of a current remover 102, whereas another data conductor 114 is on the external conductor strand 107'''', via a mounting 116 in accordance with the invention. As described above, the data conductor 114 is held on the external conductor strand 107'''' via other mountings in accordance with the invention, along the conductor line 8, wherein the entire arrangement of the data transmission system 112 is placed merely mirror-inverted to the left data transmission system 12.

By means of the mounting 16 in accordance with the invention, the data conductor 14 can be held in a simple and secure manner at a previously specified distance from the conductor strand 7, and thus from the antenna 13 of the current remover car 1. An expensive track construction for the data conductor with a carrier or other additional components is thus no longer necessary. Moreover, an already existing conductor line 8 can be simply retrofitted and a defective or used-up data conductor 14 can be simply replaced. In that the data conductor 14 is held at a previously specified distance from the conductor strand 7 and carries out the routing of the conductor strand 7, a very reliable, low-consumption data transmission can be ensured as a result of the distance between the antenna 13 and data conductor 14, which fluctuates only to a very small extent. In spite of the simple replacement capacity of the data line 14, a compact construction of the conductor line 8 and also of the current remover car 2 is produced.

Figure 9:
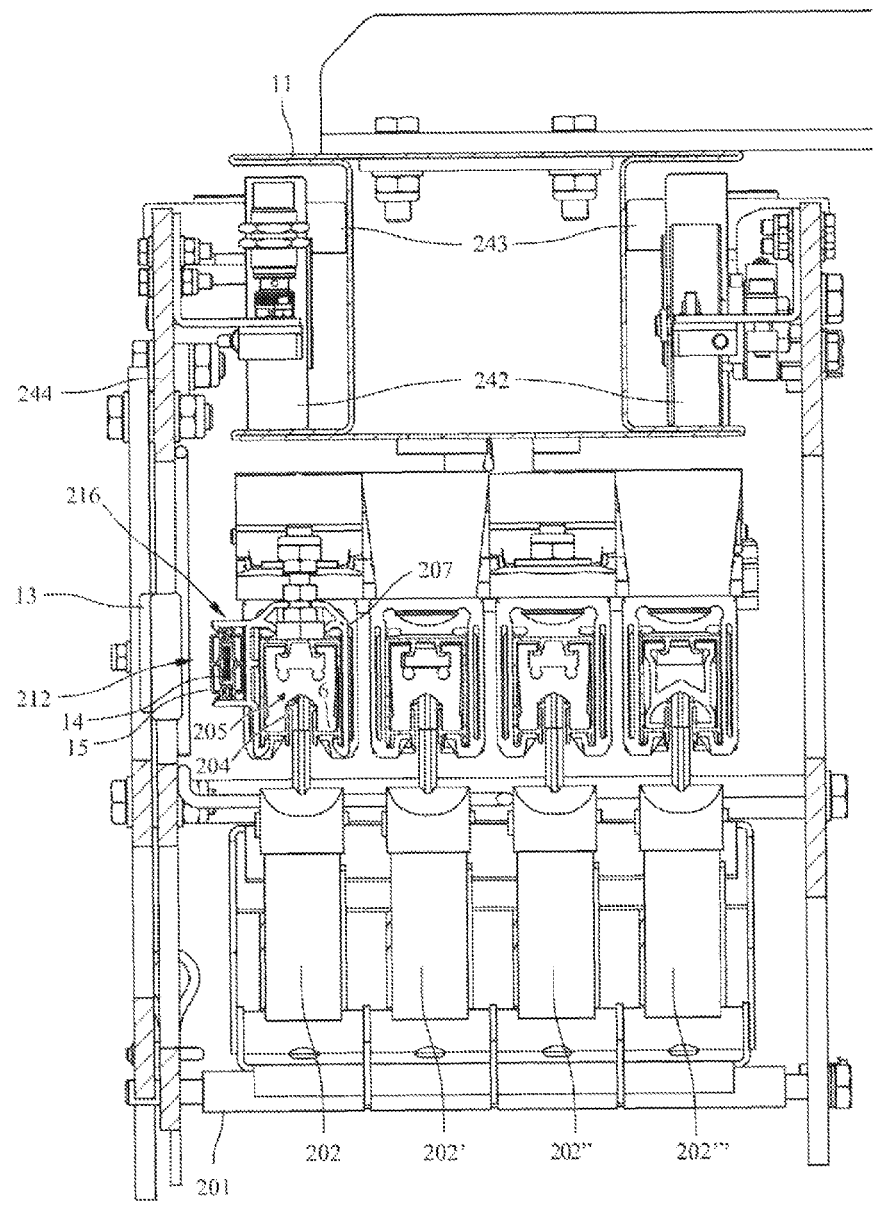
FIG. 9 shows a schematic, three-dimensional view of a part of an alternative electrical energy transmission system in accordance with the invention, with an alternative data transmission system in accordance with the invention, and an alternative mounting in accordance with the invention.

FIG. 9 shows a schematic, three-dimensional view of a part of an alternative electrical energy transmission system in accordance with the invention, with an alternative data transmission system in accordance with the invention, and an alternative mounting in accordance with the invention, which essentially corresponds to the embodiment according to FIGS. 1-7. Corresponding parts are therefore designated the same and provided with the same reference symbols.

A current remover car 201, alluded to schematically in FIG. 9, has current removers 202, 202', 202'', 202''', developed identically to a large extent and in a manner which is in fact known, for which reason, above all, the current remover 202 is described below. The statements in this respect are also correspondingly valid for the other current removers 202-202''', etc., unless otherwise indicated. In a manner which is in fact known, the current remover 202 supplies electrical energy to the electrical consumer of the vehicles. To this end, as with the embodiment described in FIGS. 1-7, a slider 204 is pressed upward, by means of the force of a spring, against an electrically conductive conductor profile 205.

For the further electrical insulation and for the protection against external effects, the conductor profile 205 is inserted into an insulation profile 206, which together, again, form an elongated conductor strand 207. In addition to this, essentially identically developed conductor strands are not designated extra in FIG. 9 for reasons having to do with a simpler representation. The conductor strand 7 and the other conductor strands are fastened to the vehicle or the crane via a carrying rod 211. In the carrying rod 211, carrying rollers 242 and guide rollers 243 of the current remover car 201 also run in a manner which is in fact known. The components of the energy transmission system described above are in fact known to the specialist with respect to the development and the function, and require no further explanation.

In contrast to the embodiment shown in FIGS. 1-7, a data transmission system 212 is provided in the alternative embodiment of the invention shown in Figure [sic; no number given], in which the antenna 13 is not fastened to one of the current removers 202-202''', but rather to a frame 244 of the current remover car 201. The data conductor 14 is again provided as the counterpart of the antenna 13; it is surrounded by the two-part data conductor profile 15 made of plastic.

The data conductor profile 15 with the data conductor 14 is fastened here to the conductor strand 207, corresponding to the current remover 202, by means of an alternative mounting 216 in accordance with the invention, at a small distance from the antenna 13. The mounting 216 corresponds, in many parts, to the mounting 6 from FIGS. 4 and 5, so that, below, only the differences are explained with the aid of FIGS. 10 and 11. The same parts again bear the same designations and the same reference symbols, so that one can dispense with a detailed description of these parts here, as happened already for FIGS. 4 and 5.

The mounting 216 differs from the mounting 6 essentially in that the data carrier profile 15 is not held at a distance from the conductor strand 207 via a cantilever arm 30, but rather is placed directly on a side of a dimensionally stable mounting leg 219 of the mounting 216, turned away from the mounting leg 19'.

In order to fasten the mounting 216 on the conductor strand 207, the mounting leg 219 also has a latch lug 20, pointing toward the middle section 18, just like the mounting leg 19 from FIG. 4, with a corresponding latch groove 21 on its front, free end. Just like the mounting 16 from FIG. 4, the mounting 216 can therefore be stuck on the conductor strand 207. Here too, a fixing device 23, described in detail in FIGS. 4-6, can also be provided advantageously for the further improvement of the seat of the mounting 216 on the insulation profile 6.

In contrast to the embodiment according to FIG. 4, the mounting leg 219, however, has the data conductor section 31, shown in FIGS. 4 and 6, with a holder 232 on its outside. In the embodiment according to FIGS. 9-11, the holder 232 for the data conductor profile 15 of the data conductor 14, however, is turned away toward the outside and away from the mounting section. Otherwise, the holder 232 merely differs from the one in [sic] holder 32 from FIGS. 4 and 6 in that a fixing screw 34 is not provided here.

In order to guarantee the stability of the holder 232 and in particular its bottom 245, at least one bar 246 is provided on the side of the leg 219, facing the leg 19', in the area of the bottom 245, with the bar running in the longitudinal direction L of the conductor strand 207. This bar 246 is pressed into the holder 232 against the insulation profile 6 with the conductor profile 5, in particular with the insertion of the data conductor profile 15 into the holder 232 against the insulation profile, so that the bottom 245 of the holder 232 is hardly pressed through. Instead of a bar 246, it is also possible to provide several bars or other reinforcements for the bottom, for example, a continuously thicker bottom or longitudinal and transverse bars. The embodiment shown in FIG. 10 has the advantage that the bottom 245 can yield at least slightly, so that the legs of the holder 232, carrying the snap hooks 33, 33', can yield more rapidly with the insertion of the data conductor profile 15 and are not stressed so much, as would be the case with a thicker and/or stiffer bottom 245.

The alternative embodiment of the mounting described in FIGS. 9-11 has the advantage of a very compact construction, in which no overhanging cantilever arm 30 of the mounting 16 need be provided. It is precisely with very narrowly built current remover systems, thus, that a data transmission system 212 in accordance with the invention can still be used. Also, it is possible in this embodiment to readily insert the data conductor profile 15 with the data conductor 14 from the outside into the holder 232 of the mounting 216, so that a simple assembly and dismantling of the data conductor profile 15 with the data conductor 14 can be made possible, and a damage of the cantilever arm 30 of the mounting 16 can be avoided.

The invention claimed is:

1. A mounting system for exchanging data with a moving vehicle that obtains locomotive power from contact with one or more power buses, the system comprising:
a data bus separate and distinct from a power bus;
a mounting bracket directly connectable to and extending away from an outer contour of the power bus, the bracket sized and dimensioned to retain the data bus at a predetermined vertical and horizontal position relative to the power bus.

2. The system of claim 1, wherein the mounting bracket includes opposed mounting legs, with latches on their free ends, the system further including an insulator sized and dimensioned to retain a power bus, and to be positioned between the mounting legs and including a profile which engages the mounting bracket latches.

3. The system of claim 2, wherein the latches are latching lugs, facing one another.

4. The system of claim 2, further including a clamp connected to the mounting bracket, the clamp moveable in the direction of the latches to secure the mounting bracket to the power bus.

5. The system of claim 1, wherein the mounting bracket includes a data bus holder defining a holder space corresponding in shape to the outer contour of a data conductor of the data bus or a data profile of the data bus surrounding the data conductor.

6. The system of claim 5, wherein the mounting bracket includes snap hooks for holding the data conductor or the data conductor profile.

7. The system of claim 6, further including at least one fixing screw extending through the mounting bracket for fixing the data conductor or data conductor profile against the snap hooks.

8. The system of claim 6, wherein the data conductor or the data conductor profile includes stops positioned to engage the snap hooks.

9. The system of claim 5, wherein the data conductor profile consists of two elongated profile halves, which can be latched with one another and which surround, at least in part, the data conductor.

10. The system of claim 1, wherein the mounting bracket includes a cantilever arm extending away from the power bus.

11. The system of claim 1, wherein the power bus includes an insulator surrounding a conductor, and the mounting bracket is positionable upon an external surface of the insulator.

12. The system of claim 11, wherein the mounting bracket includes two opposed side mounting legs, at least one of the mounting legs having a distal fastening element dimensioned to engage a profile of the insulator.

13. The system of claim 12, the mounting bracket including a reinforcement adjacent to the power bus.

14. The system of claim 1, further including a plurality of mounting brackets mutually spaced apart along the power bus, thereby configured to hold the data conductor at the predetermined distance from the power bus along a length of the power bus.

15. The system of claim 14, further including another plurality of mounting brackets mutually spaced apart along the power bus and holding another data conductor at a predetermined distance from the power bus or another power bus along the length of the power bus.

16. The system of claim 14, wherein the plurality of mounting brackets hold the data conductor within a predetermined horizontal distance from the power bus.

17. The system of claim 14, wherein the plurality of mounting brackets are placed along an outermost power bus.

18. The system of claim 14, further including an antenna and a slider which are located on a current remover mounted to the vehicle, the slider movable to be maintained in contact with a power bus during motion of the vehicle, the antenna moveable with the slider.

19. The system of claim 18, wherein the slider can move in a vertical direction relative to the vehicle.

20. The system of claim 1, wherein the mounting bracket includes an extension arm extending away from the power bus and including a data bus holder at a distal end of the arm.

21. The system of claim 20, wherein the power bus includes electrical insulation, and the mounting bracket surrounds at least a portion of the electrical insulation.

22. The system of claim 1, wherein the mounting bracket includes two legs which extend along opposite sides of the power bus, and an arm extending away from the two legs.

23. A method of exchanging data with a moving vehicle that obtains locomotive power from contact with one or more power buses, the method comprising:
providing a mounting bracket which is attachable to one of the one or more power buses to surround a portion of the power bus and to extend away from the power bus, the bracket sized and dimensioned to retain and position a data bus at a fixed distance relative to the power bus;
providing a current remover affixable to the vehicle, the current remover including
a slider support,
a power transmitting slider supported by the slider support to be moved by the slider support to maintain electrical contact with the power bus during motion of the vehicle,
an antenna configured to receive a data signal from the data bus, the antenna mounted to the slider support to be thereby maintained at a predetermined distance from the power bus and thereby the data bus while the vehicle is moving.

24. A method of exchanging data with a moving vehicle that obtains locomotive power from contact with one or more power buses, the data carried on a data bus that is separate and distinct from the one or more power buses, the method comprising:
providing a data bus carrier connectable to one of the one or more power buses to extend away from the power bus, the data bus carrier sized and dimensioned to retain and position the data bus at a fixed distance relative to the power bus;
providing a slider support which moveably supports a power transmitting slider to maintain contact with the power bus when the vehicle is moving;
providing an antenna connected to the slider support to move with the slider, thereby maintaining a fixed position of the antenna relative to the power bus when the vehicle is moving, and to thereby maintain a fixed position of the antenna relative to the data bus when the vehicle is moving.

25. The method of claim 24, the data bus carrier including legs surrounding at least a portion of the power bus, and further including an extension arm connected to the legs at a proximal end, the extension arm having a distal end supporting the data bus holder.

26. A mounting system for exchanging data with a moving vehicle that obtains locomotive power from contact with one or more power buses and including a data bus separate and distinct from a power bus, the system comprising:
a mounting bracket directly connectable to one of the one or more power buses and extending away from the power bus, the bracket sized and dimensioned to retain and position the data bus at a fixed distance relative to the power bus;
a current remover affixable to the vehicle, including
a slider support,
a power transmitting slider supported by the slider support to be moved by the slider support to maintain contact with the power bus during motion of the vehicle, and
an antenna support configured to provide support for an antenna configured to receive a data signal from the data bus, the antenna support mounted to the slider support to be thereby maintained at a predetermined distance from the power bus and thereby the data bus while the vehicle is moving.

27. A mounting system for exchanging data with a moving vehicle that obtains locomotive power from contact with one or more power buses and a separate data bus, the system comprising:
a current remover affixed to the vehicle, including
a slider support,
a power transmitting slider supported by the slider support to be moved by the slider support to maintain contact with the power bus during motion of the vehicle, and
an antenna configured to receive a data signal from the data bus, the antenna mounted to the slider support to be thereby maintained at a predetermined distance from the power bus and thereby the data bus while the vehicle is moving.

* * * * *